United States Patent
Vaidya

(10) Patent No.: US 8,776,044 B1
(45) Date of Patent: Jul. 8, 2014

(54) SYSTEMS AND METHODS FOR PROVIDING COMPUTER CLUSTER POLICIES FOR IMPLEMENTATION IN COMPUTER CLUSTER ENVIRONMENTS

(75) Inventor: Anish Vaidya, San Jose, CA (US)

(73) Assignee: Symantec Corporation, Mountain View, CA (US)

(*) Notice: Subject to any disclaimer, the term of this patent is extended or adjusted under 35 U.S.C. 154(b) by 134 days.

(21) Appl. No.: 13/281,469

(22) Filed: Oct. 26, 2011

(51) Int. Cl.
*G06F 9/44* (2006.01)

(52) U.S. Cl.
USPC ............................................. 717/171

(58) Field of Classification Search
USPC ............................................. 717/171
See application file for complete search history.

(56) References Cited

U.S. PATENT DOCUMENTS

| 7,900,206 B1* | 3/2011 | Joshi et al. ............... 718/104 |
| 2006/0053216 A1* | 3/2006 | Deokar et al. ............ 709/223 |
| 2008/0126793 A1* | 5/2008 | Jostmeyer et al. ....... 713/100 |
| 2010/0169860 A1* | 7/2010 | Biazetti et al. ........... 717/107 |
| 2011/0179173 A1* | 7/2011 | Colrain et al. ........... 709/226 |

* cited by examiner

*Primary Examiner* — Li B Zhen
*Assistant Examiner* — Hui-Wen Lin
(74) *Attorney, Agent, or Firm* — ALG Intellectual Property, LLC

(57) ABSTRACT

A computer-implemented method for providing computer cluster policies for implementation in computer cluster environments may include (1) identifying a computer cluster environment capable of executing a plurality of applications, (2) creating a computer cluster policy that (a) identifies, within the plurality of applications, at least one dependent application that is dependent upon at least one other application and (b) identifying at least one platform-agnostic action to be performed on the dependent application in response to detection of at least one event associated with the other application, and then (3) providing the computer cluster policy to high-availability software installed in the computer cluster environment to enable the high-availability software to implement the computer cluster policy in the computer cluster environment. Various other systems, methods, and computer-readable media are also disclosed.

19 Claims, 6 Drawing Sheets

Computer Cluster Policy
120

---

Local Events-Actions Table

| LOCAL EVENT(S) THAT TRIGGER LOCAL ACTION(S) | LOCAL ACTION(S) TRIGGERED BY LOCAL EVENT(S) |
|---|---|
| Application Installed on Computer Cluster 208(1) Faults | Notify Computer Cluster 208(N) That Application Installed on Computer Cluster 208(1) Has Faulted |

Remote Events-Actions Table

| REMOTE EVENT(S) THAT TRIGGER LOCAL ACTION(S) | LOCAL ACTION(S) TRIGGERED BY REMOTE EVENT(S) |
|---|---|
| Application Installed on Computer Cluster 208(N) Faults | Take Application Installed on Computer Cluster 208(1) Offline |
| Application Installed on Computer Cluster 208(N) Is Brought Online | Bring Application Installed on Computer Cluster 208(1) Online |

Application Dependencies Table

| DEPENDENT APPLICATION | APPLICATION UPON WHICH DEPENDENT APPLICATION DEPENDS |
|---|---|
| Application Installed on Computer Cluster 208(1) | Application Installed on Computer Cluster 208(N) |

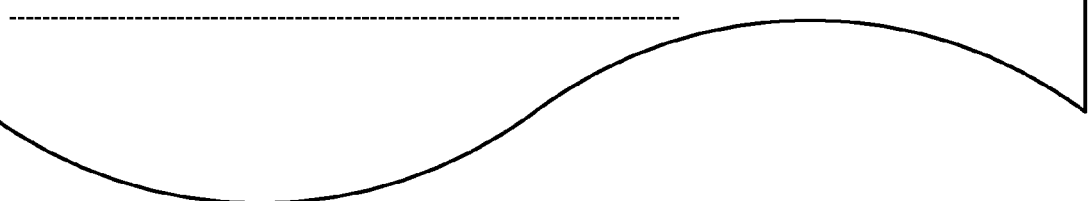

FIG. 4

SYSTEMS AND METHODS FOR PROVIDING COMPUTER CLUSTER POLICIES FOR IMPLEMENTATION IN COMPUTER CLUSTER ENVIRONMENTS

BACKGROUND

In a computer cluster environment, one or more computer clusters may implement a policy that controls certain actions affecting the performance of installed applications. Such a policy may identify one or more dependencies that exist between applications installed on the computer clusters in the computer cluster environment. For example, a policy may identify a dependent application installed on a computer cluster that is dependent upon another application installed on another computer cluster.

In addition to identifying dependencies that exist between applications, the policy may also identify one or more actions to be performed on dependent applications in response to certain events occurring in the computer cluster environment. For example, if a dependent application installed on a computer cluster is dependent upon another application, the policy may instruct the computer cluster to shut down the dependent application whenever the other application faults. In this example, by shutting down the dependent application based on the policy's instruction, the computer cluster may prevent the dependent application from corrupting stored data and/or faulting due to its inability to function properly without the other application.

Unfortunately, while such policies may serve an important role in handling faults that occur in computer cluster environments, existing policy technologies may suffer from one or more shortcomings and/or inefficiencies that have a negative impact on user experience. For example, many existing policy technologies may be unable to configure a platform-agnostic policy capable of being implemented by different types of high-availability software installed in the computer cluster environment. In another example, many existing policy technologies may be unable to incorporate rolling upgrades and/or patches aimed at repairing software bugs that result in faulty interpretation of the policy. As such, the instant disclosure identifies a need for systems and methods for configuring upgradable policies capable of being implemented by different types of high-availability software installed in computer cluster environments.

SUMMARY

As will be described in greater detail below, the instant disclosure generally relates to systems and methods for providing computer cluster policies for implementation in computer cluster environments. In one example, a computer-implemented method for accomplishing such a task may include (1) identifying a computer cluster environment capable of executing a plurality of applications, (2) creating a computer cluster policy that (a) identifies, within the plurality of applications, at least one dependent application that is dependent upon at least one other application and (b) identifying at least one platform-agnostic action to be performed on the dependent application in response to detection of at least one event associated with the other application, and then (3) providing the computer cluster policy to high-availability software installed in the computer cluster environment to enable the high-availability software to implement the computer cluster policy in the computer cluster environment by (a) identifying, based on the high-availability software's interpretation of the platform-agnostic action, at least one platform-specific command capable of performing the platform-agnostic action upon execution of the platform-specific command and (b) executing the platform-specific command to perform the platform-agnostic action on the dependent application in response to detection of the event associated with the other application.

In some examples, the method may also include providing a user interface to a user of the computer cluster environment and receiving, from the user via the user interface, user input that is used to identify (1) the dependency between the dependent application and the other application, (2) the platform-agnostic action to be performed on the dependent application in response to detection of the event associated with the other application, and/or (3) the event associated with the other application. In such examples, the method may further include creating the computer cluster policy based at least in part on the user input received from the user via the user interface.

In some examples, the method may also include receiving a policy upgrade configured to update at least a portion of the computer cluster policy and then, in response to receiving the policy upgrade, (1) implementing the policy upgrade by updating the portion of the computer cluster policy and (2) notifying the high-availability software of the policy upgrade. In such examples, the method may further include providing a user interface to a user of the computer cluster environment and then receiving, from the user via the user interface, user input that is used to identify (1) the portion of the computer cluster policy to be updated and (2) at least one modification to be incorporated into the portion of the computer cluster policy as part of the policy upgrade.

In one example, the policy upgrade may modify the computer cluster policy such that the computer cluster policy identifies at least one different dependency associated with the dependent application. In another example, the policy upgrade may modify the computer cluster policy such that the computer cluster policy identifies at least one different platform-agnostic action to be performed on the dependent application. In a further example, the policy upgrade may modify the computer cluster policy such that the computer cluster policy identifies at least one different event capable of triggering performance of the platform-agnostic action on the dependent application.

In addition, the method may include distributing the updated portion of the computer cluster policy to the high-availability software. For example, the method may include receiving a request from the high-availability software to obtain the computer cluster policy and then, in response to receiving the request from the high-availability software, distributing the computer cluster policy to the high-availability software. In this example, the request to obtain the computer cluster policy may have been initiated by the high-availability software as part of a boot-up process executed in the computer cluster environment.

In some examples, the computer cluster environment may be a single cluster environment that includes a single computer cluster or a multi-cluster environment that includes a plurality of computer clusters. In one example, the high-availability software installed in the computer cluster environment may include a plurality of different types of high-availability software installed in the multi-cluster environment. In this example, the method may include configuring the computer cluster policy in a manner that enables each different type of high-availability software installed in a multi-cluster environment to implement the computer cluster policy.

In some examples, the computer cluster policy may include, for each computer cluster in a multi-cluster environment, (1) a local events-actions table that identifies at least one locally triggered platform-agnostic action to be performed by the computer cluster in question in response to detection of a local event associated with a local application capable of being executed by the computer cluster in question, (2) a remote events-actions table that identifies at least one remotely triggered platform-agnostic action to be performed by the computer cluster in question in response to detection of a remote event associated with a remote application capable of being executed by a remote computer cluster in the multi-cluster environment, and/or (3) an application dependencies table that identifies at least one dependency between the local application and the remote application.

In some examples, a system for implementing the above-described method may include an identification module programmed to identify a computer cluster environment capable of executing a plurality of applications. The system may also include a configuration module programmed to create a computer cluster policy that (1) identifies, within the plurality of applications, at least one dependent application that is dependent upon at least one other application and (2) identifies at least one platform-agnostic action to be performed on the dependent application in response to detection of at least one event associated with the other application The system may also include a distribution module programmed to provide the computer cluster policy to high-availability software installed in the computer cluster environment to enable the high-availability software to implement the computer cluster policy in the computer cluster environment by (1) identifying, based on the high-availability software's interpretation of the platform-agnostic action, at least one platform-specific command capable of performing the platform-agnostic action upon execution of the platform-specific command and (2) executing the platform-specific command to perform the platform-agnostic action on the dependent application in response to detection of the event associated with the other application. The system may also include at least one processor configured to execute the identification module, the configuration module, and/or the distribution module.

In some examples, the above-described method may also be encoded as computer-readable instructions on a computer-readable-storage medium. For example, a computer-readable-storage medium may include one or more computer-executable instructions that, when executed by at least one processor of a computing device, may cause the computing device to (1) identify a computer cluster environment capable of executing a plurality of applications, (2) create a computer cluster policy that (a) identifies, within the plurality of applications, at least one dependent application that is dependent upon at least one other application and (b) identifying at least one platform-agnostic action to be performed on the dependent application in response to detection of at least one event associated with the other application, and then (3) provide the computer cluster policy to high-availability software installed in the computer cluster environment to enable the high-availability software to implement the computer cluster policy in the computer cluster environment by (a) identifying, based on the high-availability software's interpretation of the platform-agnostic action, at least one platform-specific command capable of performing the platform-agnostic action upon execution of the platform-specific command and (b) executing the platform-specific command to perform the platform-agnostic action on the dependent application in response to detection of the event associated with the other application.

As will be explained in greater detail below, by providing a computer cluster policy that identifies platform-agnostic actions to be performed in response to certain events, the various systems and methods described herein may enable the same computer cluster policy to be implemented by different types of high-availability software installed in a computer cluster environment. In addition, by providing a module that configures the computer cluster policy and another module that implements the computer cluster policy, these systems and methods may enable rolling upgrades and/or patches to be individually applied to one module without affecting the other module.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary computer cluster policy capable of being implemented in a computer cluster environment.

Figure 1:
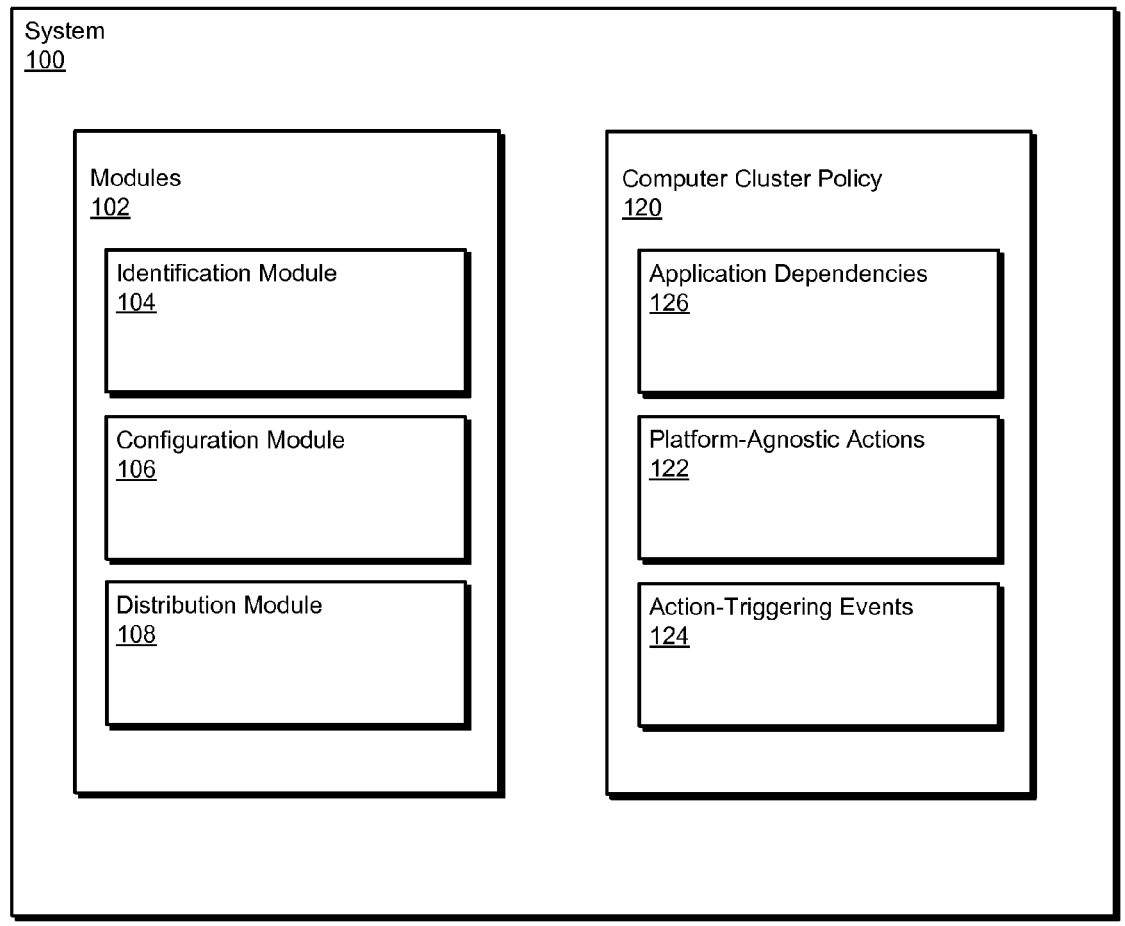
FIG. 1 is a block diagram of an exemplary system for providing computer cluster policies for implementation in computer cluster environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for providing computer cluster policies for implementation in computer cluster environments. The phrase "computer cluster policy," as used herein, generally refers to any collection of rules, instructions, and/or information associated with controlling one or more actions affecting the performance of applications installed in a computer cluster environment. In addition, the phrase "computer cluster environment," as used herein, generally refers to any type of form of computer cluster environment (such as a single cluster environment or a multi-cluster environment) that includes one or more nodes capable of executing one or more applications.

Figure 2:
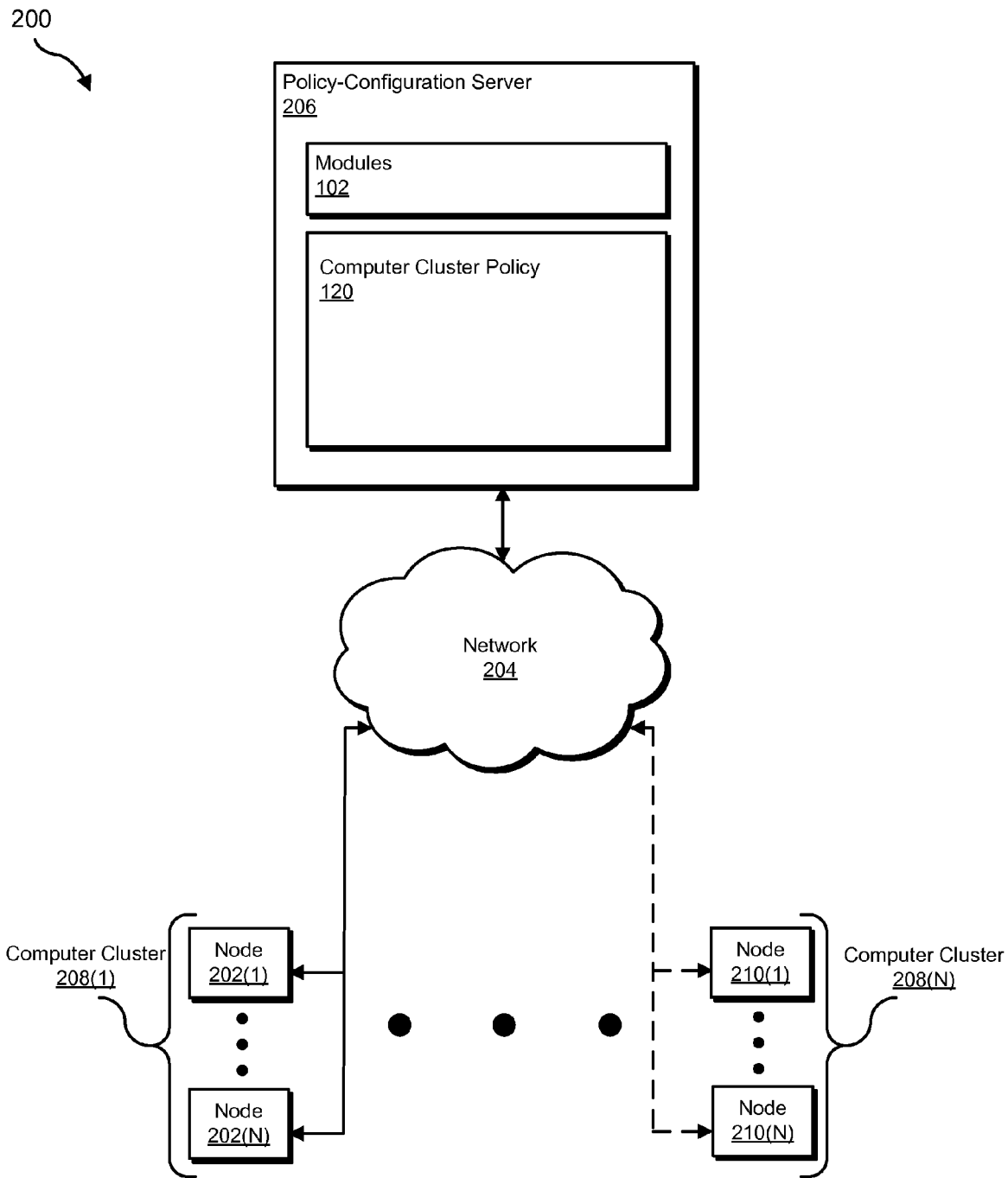
FIG. 2 is a block diagram of an exemplary system for providing computer cluster policies for implementation in computer cluster environments.

The following will provide, with reference to FIGS. 1-2, detailed descriptions of exemplary systems for providing computer cluster policies for implementation in computer cluster environments. Detailed descriptions of corresponding computer-implemented methods will also be provided in connection with FIG. 3-4. In addition, detailed descriptions of an exemplary computing system and network architecture capable of implementing one or more of the embodiments described herein will be provided in connection with FIGS. 5-6, respectively.

FIG. 1 is a block diagram of an exemplary system 100 for providing computer cluster policies for implementation in computer cluster environments. As illustrated in this figure, exemplary system 100 may include one or more modules 102 for performing one or more tasks. For example, and as will be explained in greater detail below, exemplary system 100 may include an identification module 104 programmed to identify a computer cluster environment capable of executing a plurality of applications. Exemplary system 100 may also include a configuration module 106 programmed to create a computer cluster policy that (1) identifies, within the plurality of applications, at least one dependent application that is dependent upon at least one other application and (2) identifies at least one platform-agnostic action to be performed on the dependent application in response to detection of at least one event associated with the other application.

In addition, and as will be described in greater detail below, exemplary system 100 may include a distribution module 108 programmed to provide the computer cluster policy to high-availability software installed in the computer cluster environment to enable the high-availability software to implement the computer cluster policy in the computer cluster environment by (1) identifying, based on the high-availability software's interpretation of the platform-agnostic action, at least one platform-specific command capable of performing the platform-agnostic action upon execution of the platform-specific command and (2) executing the platform-specific command to perform the platform-agnostic action on the dependent application in response to detection of the event associated with the other application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., nodes 202(1)-(N), nodes 210(1)-(N), and/or policy-configuration server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a computer cluster policy 120 capable of being implemented in a computer cluster environment. Computer cluster policy 120 may represent any collection of rules, instructions, and/or information associated with controlling one or more actions affecting the performance of applications installed in a computer cluster environment. In one example, computer cluster policy 120 may include information that (1) identifies, in a computer cluster environment, at least one dependent application that is dependent upon at least one other application and (2) identifies at least one platform-agnostic action to be performed on the dependent application in response to detection of at least one event associated with the other application.

Although not illustrated in FIG. 1, exemplary system 100 may also include one or more databases. Such databases may be configured to store data and/or information associated with providing computer cluster policies for implementation in computer cluster environments. For example, system 100 may include a database configured to store information used to create computer cluster policy 120. In this example, the database may represent portions of a single database or computing device or a plurality of databases or computing devices.

Figure 5:
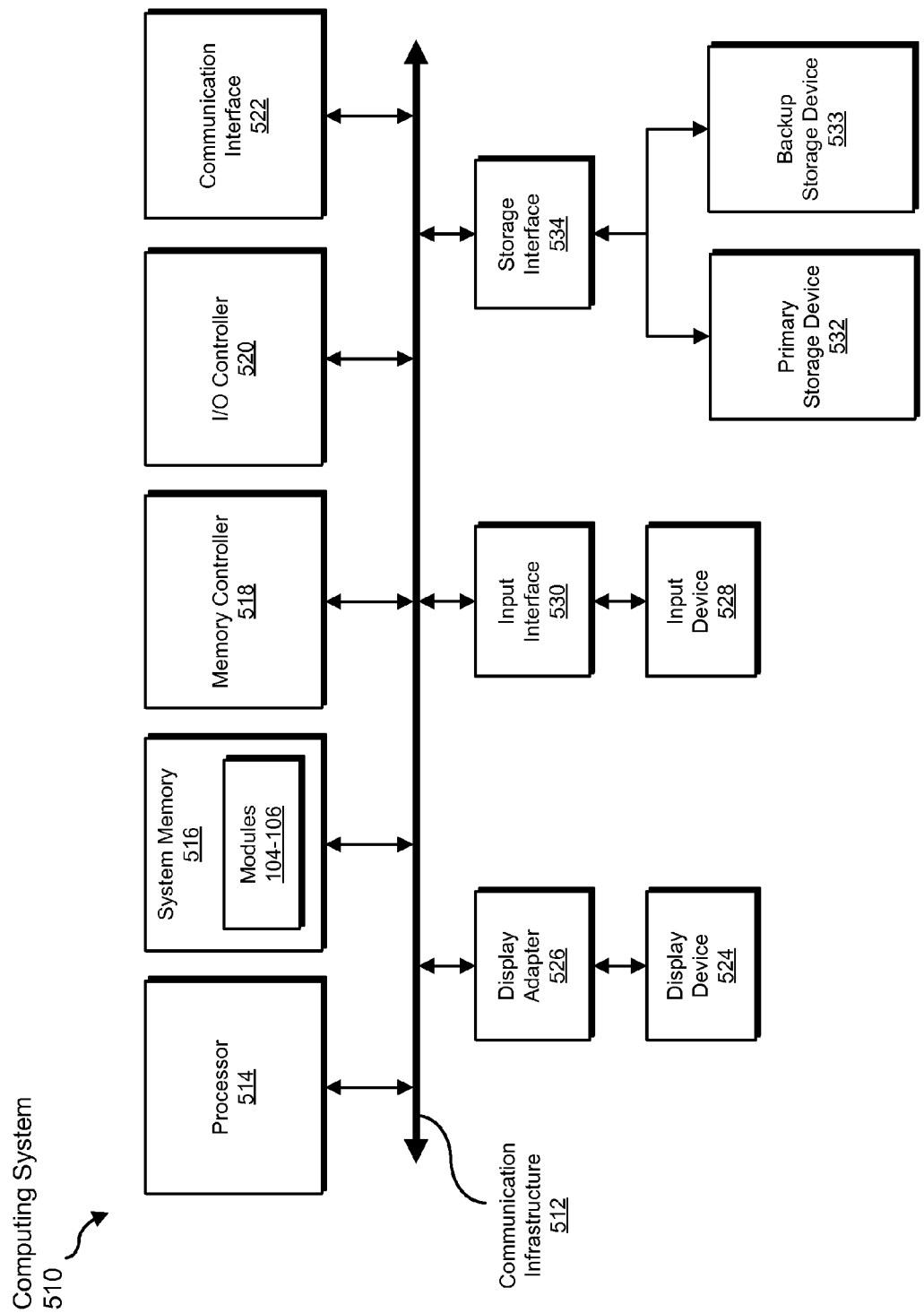
FIG. 5 is a block diagram of an exemplary computing system capable of implementing one or more of the embodiments described and/or illustrated herein.
Figure 6:
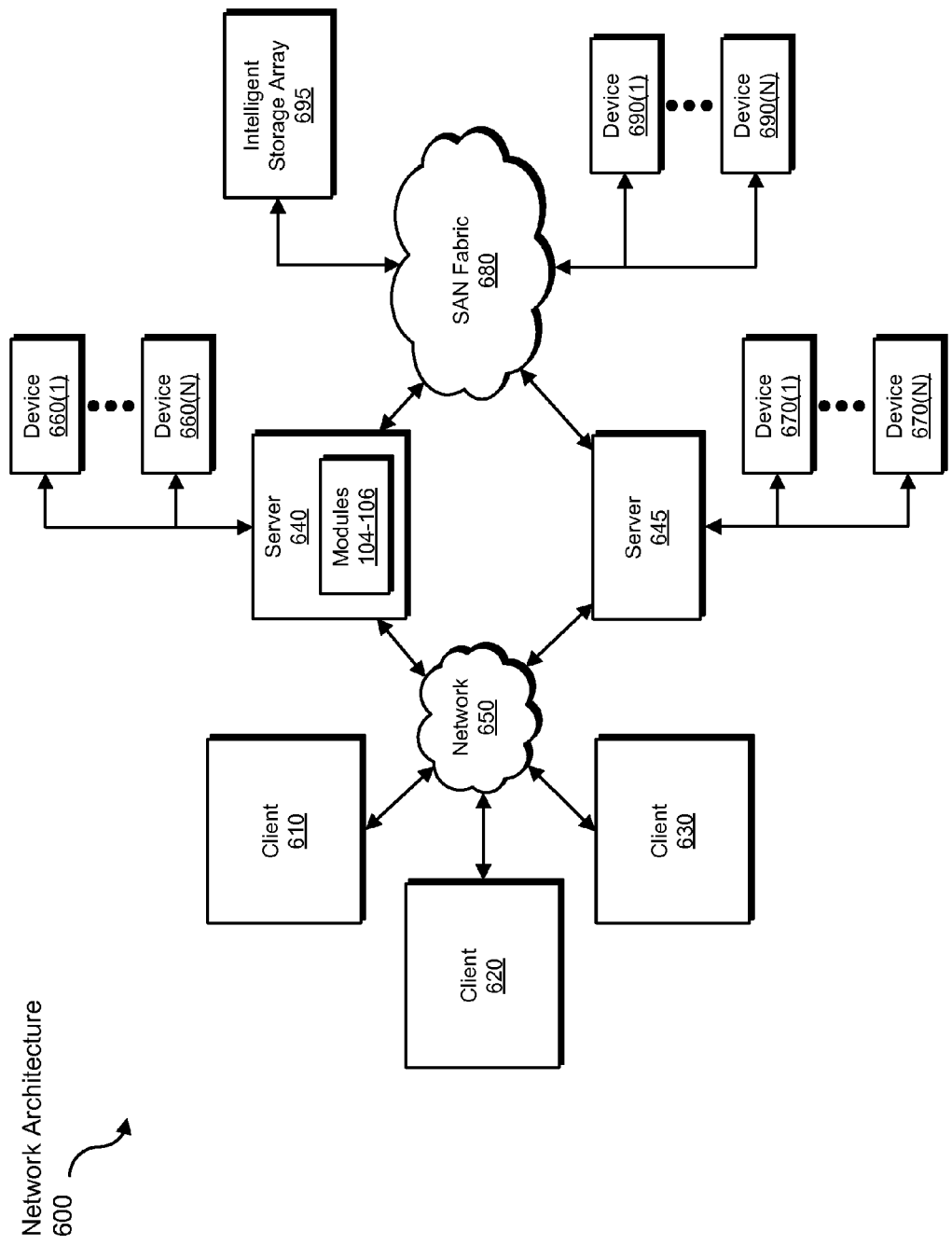
FIG. 6 is a block diagram of an exemplary computing network capable of implementing one or more of the embodiments described and/or illustrated herein.

In some embodiments, such databases may represent a portion of policy-configuration server 206 in FIG. 2, computing system 510 in FIG. 5, and/or portions of exemplary network architecture 600 in FIG. 6. Alternatively, such databases may represent one or more physically separate devices capable of being accessed by a computing device, such as policy-configuration server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a policy-configuration server 206 in communication with computer clusters 208(1)-(N) via a network 204. Computer cluster 208(1) may include nodes 202(1)-(N), and computer cluster 208(N) may include nodes 210(1)-(N).

In one embodiment, one or more of modules 102 from FIG. 1 may, when executed by at least one processor of policy-configuration server 206, enable policy-configuration server 206 to provide computer cluster policies for implementation in computer cluster environments. For example, and as will be described in greater detail below, one or more of modules 102 may cause policy-configuration server 206 to (1) identify a computer cluster environment capable of executing a plurality of applications, (2) create a computer cluster policy that (a) identifies, within the plurality of applications, at least one dependent application that is dependent upon at least one other application and (b) identifying at least one platform-agnostic action to be performed on the dependent application in response to detection of at least one event associated with the other application, and then (3) provide the computer cluster policy to high-availability software installed in the computer cluster environment to enable the high-availability software to implement the computer cluster policy in the computer cluster environment by (a) identifying, based on the high-availability software's interpretation of the platform-agnostic action, at least one platform-specific command capable of performing the platform-agnostic action upon execution of the platform-specific command and (b) executing the platform-specific command to perform the platform-agnostic action on the dependent application in response to detection of the event associated with the other application.

Nodes 202(1)-(N) and nodes 210(1)-(N) generally represent any type or form of computing device that is capable of reading computer-executable instructions and communicating with one another. In some examples, each of nodes 202(1)-(N) and nodes 210(1)-(N) may be configured to individually execute one or more applications. In other examples, nodes 202(1)-(N) and nodes 210(1)-(N) may be configured to collectively execute one or more applications by coordinating operations with other nodes in a computer cluster. Examples of nodes 202(1)-(N) and nodes 210(1)-(N) include, without limitation, laptops, desktops, servers, cellular phones, personal digital assistants (PDAs), multimedia players, embedded systems, combinations of one or more of the same, exemplary computing system 510 in FIG. 5, or any other suitable computing devices.

Computer clusters 208(1)-(N) generally represent a group of two or more nodes (e.g., nodes 202(1)-(N) or nodes 210(1)-(N)) that are capable of communicating with one another in order to collectively perform one or more tasks, such as collectively providing high availability to one or more applications and/or collectively executing one or more applications. Computer clusters 208(1)-(N) may also incorporate one or more shared resources (such as storage devices) configured to store data used by such applications. Examples of computer clusters 208(1)-(N) include, without limitation, high-availability clusters, load-balancing clusters, Beowolf clusters, high-performance computing clusters, or any other suitable computer clusters.

Policy-configuration server 206 generally represents any type or form of computing device that is capable of creating, configuring, and/or providing computer cluster policies for implementation in computer cluster environments. Examples of policy-configuration server 206 include, without limitation, application servers, web servers, and database servers configured to provide various policy and/or database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between policy-configuration server 206 and computer clusters 208(1)-(N).

Figure 3:
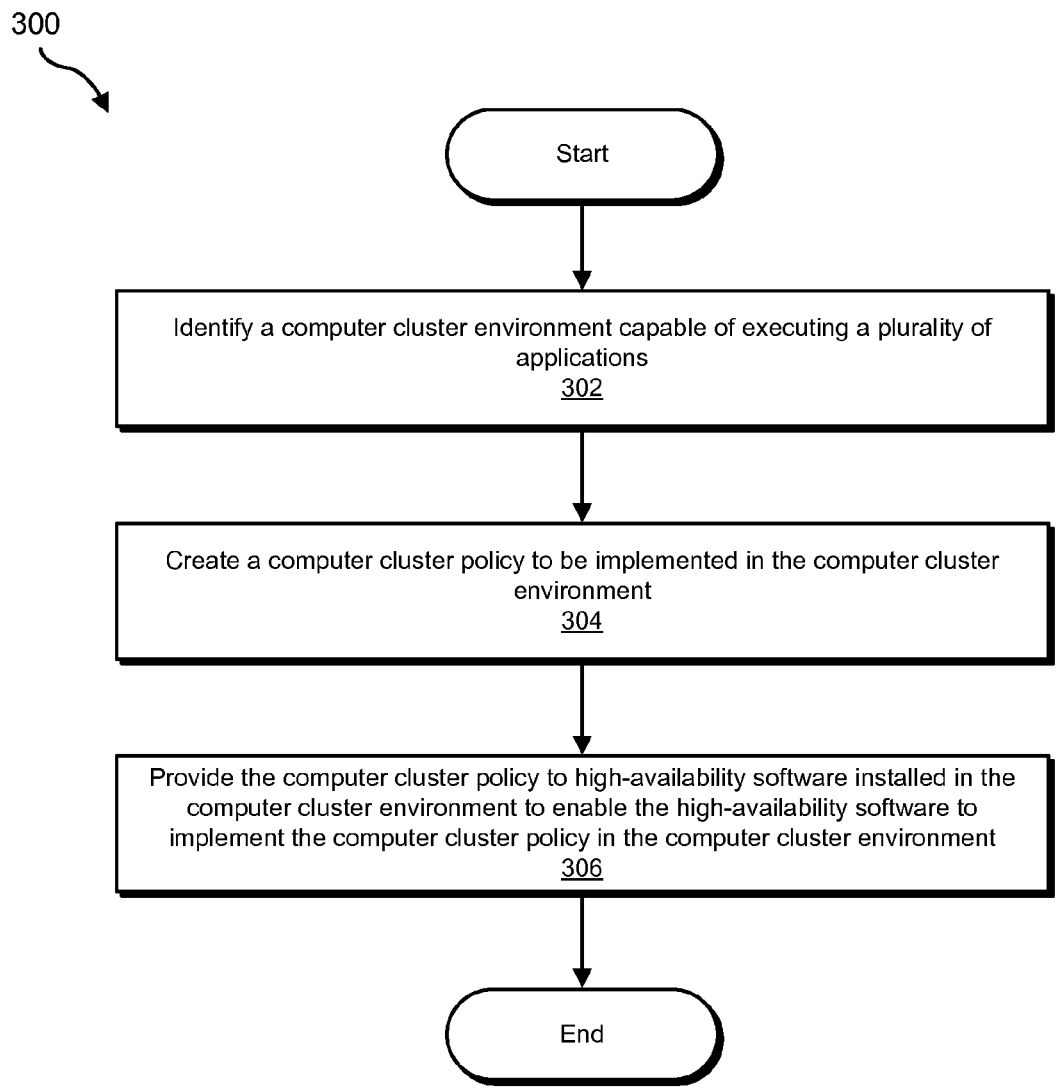
FIG. 3 is a flow diagram of an exemplary method for providing computer cluster policies for implementation in computer cluster environments.

FIG. 3 is a flow diagram of an exemplary computer-implemented method 300 for providing computer cluster policies for implementation in computer cluster environments. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the various systems described herein may identify a computer cluster environment capable of executing a plurality of applications. For example, identification module 104 may, as part of policy-configuration server 206 in FIG. 2, identify a computer cluster environment that includes computer clusters 208(1)-(N). In this example, each of computer clusters 208(1)-(N) may be configured to execute one or more applications.

The systems described herein may perform step 302 in a variety of ways. In one example, identification module 104 installed on policy-configuration server 206 may receive a notification from each computer cluster in the computer cluster environment. For example, each of computer clusters 208(1)-(N) may send a notification to identification module 104 as part of a boot-up process (initiated, e.g., when computer clusters 208(1)-(N) are powered on by a user). In this example, identification module 104 may receive each notification sent from computer clusters 208(1)-(N) and then determine, based on the received notifications, that the computer cluster environment includes computer clusters 208(1)-(N).

In another example, identification module 104 installed on policy-configuration server 206 may probe the computer clusters in communication with policy-configuration server 206 via network 204 to determine the configuration of the computer cluster environment. For example, identification module 104 may send a request for identification to each of computer clusters 208(1)-(N). In this example, in response to receiving the request for identification, each of computer clusters 208(1)-(N) may send information to identification module 104 that identifies the corresponding computer cluster as being part of the computer cluster environment. Identification module 104 may receive this information from computer clusters 208(1)-(N) and then determine, based on the received information, that the computer cluster environment includes computer clusters 208(1)-(N).

In some embodiments, the computer cluster environment identified by identification module 104 may be a multi-cluster environment that includes a plurality of computer clusters. For example, identification module 104 installed on policy-configuration server 206 may determine that computer clusters 208(1)-(N) collectively represent the computer cluster environment. In this example, each of computer clusters 208(1)-(N) may be configured to execute a different application in the computer cluster environment.

In other embodiments, the computer cluster environment identified by identification module 104 may be a single cluster environment that includes only one computer cluster. For example, identification module 104 installed on policy-configuration server 206 may determine that computer cluster 208(1) individually represents the computer cluster environment. In this example, computer cluster 208(1) may be configured to individually execute a plurality of different applications in the computer cluster environment.

Returning to FIG. 3, at step 304 one or more of the various systems described herein may create a computer cluster policy to be implemented in the computer cluster environment. For example, configuration module 106 may, as part of policy-configuration server 206, create computer cluster policy 120 to be implemented by computer clusters 208(1)-(N) in the computer cluster environment. In this example, computer cluster policy 120 may (1) identify, within the plurality of applications installed on computer clusters 208(1)-(N), at least one dependent application that is dependent upon at least one other application and (2) identify at least one platform-agnostic action to be performed on the dependent application in response to detection of at least one event associated with the other application.

The phrase "dependent application," as used herein, generally refers to any type or form of application that depends on at least one component associated with and/or at least one operation provided by another application in order to function properly. Such a dependent application may have a certain type of dependency on the other application. Examples of types of dependencies that exist between applications include, without limitation, a soft dependency involving a minimum level of dependency, a firm dependency involving a moderate level of dependency, a hard dependency involving a maximum level of dependency, and/or any other suitable type of dependency that exists between applications.

In addition, the phrase "platform-agnostic action," as used herein, generally refers to any type or form of generic representation of an action capable of being performed by a variety of different types of software. Examples of such a platform-agnostic action include, without limitation, bringing an application online, taking a local application offline, rebooting a local application, halting a local application, notifying a remote computer cluster that a local application has faulted, and/or any other suitable platform-agnostic action capable of being performed by a variety of different types of software.

The systems described herein may perform step 304 in a variety of ways. In one example, configuration module 106 installed on policy-configuration server 206 may provide a user interface to a user of the computer cluster environment. For example, configuration module 106 may cause a user interface (such as a graphical user interface) to be displayed for presentation to a user on a monitor associated with policy-configuration server 206.

In such an example, the user may enter user input via the user interface to customize or select computer cluster policy 120 for implementation in the computer cluster environment. Such user input may identify or be used to identify (1) one or more application dependencies between applications installed in the computer cluster environment, (2) one or more platform-agnostic actions, and/or (3) one or more events that trigger the platform-agnostic actions.

In a more specific example, the user may enter user input indicating that an application installed on computer cluster 208(1) is to be dependent upon a different application installed on computer cluster 208(N). In this example, the user input entered via the user interface may also indicate that at least one platform-agnostic action is to be performed on the dependent application installed on computer cluster 208(1) in response to detection of at least one event associated with the different application installed on computer cluster 208(N). Configuration module 106 installed on policy-configuration server 206 may receive the user input via the user interface and then create computer cluster policy 120 based at least in part on the user input.

In some examples, computer cluster policy 120 may represent a collection of rules, instructions, and/or information associated with controlling one or more actions affecting the performance of applications installed on computer clusters 208(1)-(N). In one example, configuration module 106 may customize at least a portion of computer cluster policy 120 for a specific computer cluster in the computer cluster environment. For example, configuration module 106 may customize at least a portion of computer cluster policy 120 to identify certain events and/or actions that are local or remote to computer cluster 208(1).

In a more specific example, configuration module 106 may configure a portion of computer cluster policy 120 to include (1) a local events-actions table that identifies at least one locally triggered platform-agnostic action to be performed by computer cluster 208(1) in response to detection of a local event associated with a local application capable of being executed by computer cluster 208(1), (2) a remote events-actions table that identifies at least one remotely triggered platform-agnostic action to be performed by computer cluster 208(1) in response to detection of a remote event associated with a remote application capable of being executed by computer cluster 208(N), and/or (3) a dependency table that identifies at least one dependency between the local application and the remote application. In this example, configuration module 106 may also configure a different portion of computer cluster policy 120 to include one or more similar tables that identify certain events and/or actions that are local or remote to computer cluster 208(N).

As such, configuration module 106 may configure a different portion of computer cluster policy 120 for each computer cluster in the computer cluster environment. In one example, configuration module 106 may configure computer cluster policy 120 to include a local events-actions table, a remote events-actions table, and/or a dependency table (similar to those tables illustrated in FIG. 4) for each computer cluster in the computer cluster environment. In this example, configuration module 106 may distinguish between different portions of computer cluster policy 120 based on the computer cluster associated with each different portion of computer cluster policy 120.

In some examples, configuration module 106 may configure computer cluster policy 120 such that at least one portion of computer cluster policy 120 omits certain rules, instructions, and/or information included in at least one different portion of computer cluster policy 120. For example, configuration module 106 may configure a portion of computer cluster policy 120 specifically for computer cluster 208(N). In one example, the portion of computer cluster policy 120 that was configured specifically for computer cluster 208(N) may omit any information regarding a platform-agnostic action to be performed by computer cluster 208(1) if such information is irrelevant to computer cluster 208(N). In another example, the portion of computer cluster policy 120 that was configured specifically for computer cluster 208(N) may omit any information regarding application dependencies (such as an application dependencies table) if the application installed on computer cluster 208(N) is not a dependent application.

FIG. 4 illustrates an exemplary implementation of at least a portion of computer cluster policy 120 configured specifically for computer cluster 208(1). As shown in FIG. 4, computer cluster policy 120 may include (1) a local events-actions table that identifies a local event that triggers a platform-agnostic action (in this example, "Application Installed on Computer Cluster 208(1) Faults") and the locally triggered platform-agnostic action to be performed by computer cluster 208(1) (in this example, "Notify Computer Cluster 208(N) That Application Installed on Computer Cluster 208(1) Has Faulted"), (2) a remote events-actions table that identifies remote events that trigger platform-agnostic actions (in this example, "Application Installed on Computer Cluster 208(N) Faults" and "Application Installed on Computer Cluster 208(N) Is Brought Online") and the respective remotely triggered platform-agnostic actions to be performed by computer cluster 208(1) (in this example, "Take Application Installed on Computer Cluster 208(1) Offline" and "Bring Application Installed on Computer Cluster 208(N) Online"), and (3) an application dependencies table that identifies a dependent application (in this example, "Application Installed on Computer Cluster 208(1)") and a different application upon which the dependent application depends ("in this example, "Application Installed on Computer Cluster 208(N)").

In some embodiments, as described above, if the computer cluster environment includes computer clusters 208(1)-(N), configuration module 106 may create computer cluster policy 120 to be implemented on computer clusters 208(1)-(N). In one example, if the computer cluster environment includes different types of high-availability software installed on computer clusters 208(1)-(N), configuration module 106 may configure computer cluster policy 120 in a manner that enables each different type of high-availability software to implement computer cluster policy 120. For example, if computer cluster 208(1) represents a VERITAS CLUSTER SERVER (sometimes referred to as VCS) and computer cluster 208(N) represents a MICROSOFT CLUSTER SERVER (sometimes referred to as MSCS), configuration module 106 may configure a generic representation of computer cluster policy 120 that enables both the VERITAS CLUSTER SERVER and the MICROSOFT CLUSTER SERVER to implement computer cluster policy 120 despite representing different types of high-availability software.

In such an example, configuration module 106 may configure the generic representation of computer cluster policy 120 by providing generic information that is interpretable by both the VERITAS CLUSTER SERVER and the MICROSOFT CLUSTER SERVER. Such generic information provided in computer cluster policy 120 may identify (1) one or more application dependencies between applications installed on the computer clusters, (2) one or more platform-agnostic actions, and/or (3) one or more events that trigger the platform-agnostic actions.

In other embodiments, if the computer cluster environment includes only computer cluster 208(1), configuration module 106 may create computer cluster policy 120 to be implemented only on computer cluster 208(1). In one example, computer cluster 208(1) may be capable of executing a plurality of applications. For example, computer cluster 208(1) may include a dependent application installed on node 202(1) that is dependent upon a different application installed on node 202(N). In this example, configuration module 106 may configure computer cluster policy 120 to identify at least one platform-agnostic action to be performed on the dependent application installed on node 202(1) in response to at least one event associated with the different application installed on node 202(N).

By providing a module (e.g., configuration module 106) that configures computer cluster policy 120 and another module (e.g., the high-availability software installed on computer clusters 208(1)-(N)) that implements computer cluster policy 120, the computer cluster environment described herein may enable rolling upgrades and/or patches to be individually applied to one module without affecting the other module. For example, if a software bug is adversely affecting the ability of configuration module 106 to properly configure computer cluster policy 120, the computer cluster environment may apply a rolling upgrade and/or a patch aimed at repairing the software bug without affecting the ability of the high-availability software to implement computer cluster policy 120. In another example, if a user wants to add a new computer cluster policy to configuration module 106, the user may apply a rolling upgrade and/or patch that updates configuration module 106 without affecting the ability of the high-availability software to implement computer cluster policy 120.

Returning to FIG. 3, at step 306 one or more of the various systems described herein may provide the computer cluster policy to high-availability software installed in the computer cluster environment to enable the high-availability software to implement the computer cluster policy in the computer cluster environment. For example, distribution module 108 may, as part of policy-configuration server 206, provide computer cluster policy 120 to high-availability software installed on computer clusters 208(1)-(N) to enable the high-availability software to implement computer cluster policy 120 on computer clusters 208(1)-(N).

The systems described herein may perform step 306 in a variety of ways. In one example, distribution module 108 installed on policy-configuration server 206 may receive a request to obtain computer cluster policy 120 from the high-availability software installed on each of computer clusters 208(1)-(N). For example, a user of computer cluster 208(1) may power on computer cluster 208(1), thereby initiating a boot-up process that causes the high-availability software installed on computer cluster 208(1) to send a request to obtain computer cluster policy 120 to distribution module 108. In this example, in response to receiving the request from the high-availability software installed on computer cluster 208(1), distribution module 108 may distribute a portion of computer cluster policy 120 that is relevant to computer cluster 208(1) to the high-availability software installed on computer cluster 208(1).

In another example, distribution module 108 installed on policy-configuration server 206 may distribute (or redistribute) at least a portion of computer cluster policy 120 upon receiving a policy upgrade configured to update the portion of computer cluster policy 120. For example, configuration module 106 may provide a user interface to a user of the computer cluster environment. In this example, the user may enter user input via the user interface to update or modify at least a portion of computer cluster policy 120. Such user input may identify or be used to identify the portion of computer cluster policy 120 to be updated and/or at least one modification to be incorporated into the portion of computer cluster policy 120 as part of the policy upgrade.

In a more specific example, the user may enter user input indicating that the policy upgrade is to update or modify computer cluster policy 120 by identifying (1) at least one different dependency associated with the dependent application installed on computer cluster 208(1), (2) at least one different platform-agnostic action to be performed on the dependent application installed on computer cluster 208(1), and/or (3) at least one different event capable of triggering performance of the platform-agnostic action. In this example, configuration module 106 installed on policy-configuration server 206 may receive the user input via the user interface and then update computer cluster policy 120 based at least in part on the user input.

In one example, upon updating computer cluster policy 120, configuration module 106 may redistribute all of computer cluster policy 120 to computer clusters 208(1)-(N). In another example, configuration module 106 may only distribute the updated portion of computer cluster policy 120 to the computer cluster whose portion of computer cluster policy 120 was updated as part of the policy upgrade.

In some examples, upon obtaining computer cluster policy 120, the high-availability software installed on computer clusters 208(1)-(N) may interpret each platform-agnostic action identified in computer cluster policy 120. In such examples, the high-availability software installed on computer clusters 208(1)-(N) may identify, based on this interpretation, at least one platform-specific command capable of performing each platform-agnostic action identified in computer cluster policy 120. The phrase "platform-specific command," as used herein, generally refers to any type or form of computer-executable command that is specific or unique to a particular type of software.

For example, if computer cluster 208(1) represents a VERITAS CLUSTER SERVER, the VERITAS CLUSTER SERVER may interpret the platform-agnostic action "Bring Application Installed on Computer Cluster 208(1) Online" (as identified in computer cluster policy 120 in FIG. 4). In this example, the VERITAS CLUSTER SERVER may determine, based on this interpretation, that the command capable of performing this platform-agnostic action on the VERITAS CLUSTER SERVER is "hagrp-online <name of application installed on computer cluster 208(1)>." Upon determining that the platform-specific command capable of performing this platform-agnostic action is "hagrp-online <name of application installed on computer cluster 208(1)>," the VERITAS CLUSTER SERVER may execute the platform-specific command in response to detection of the event "Application Installed on Computer Cluster 208(N) Is Brought Online" (as identified in computer cluster policy 120 in FIG. 4).

In some embodiments, if the computer cluster environment includes only computer cluster 208(1), distribution module 108 may provide computer cluster policy 120 to high-availability software installed on computer cluster 208(1) to enable the high-availability software to implement computer cluster policy 120 on computer cluster 208(1). In one example, computer cluster 208(1) may include a dependent application installed on node 202(1) that is dependent upon a different application installed on node 202(N). In this example, computer cluster policy 120 may be configured to instruct node 202(1) to take the dependent application offline if the different application installed on node 202(N) faults.

Although not illustrated in FIG. 2, the computer cluster environment may also be described in terms of different phases. In one example, the computer cluster environment may include a specification phase, an interpretation phase, and an execution phase. For example, the computer cluster environment may include a specification phase in which a user of the computer cluster environment is able to specify one or more application dependencies that exist between applications installed in the computer cluster environment. In this example, as part of the specification phase, the user may enter user-friendly input that identifies such application dependencies (whether soft, firm, or hard dependencies) via a user interface.

In addition, the computer cluster environment may include an interpretation phase in which the user-friendly input entered by the user is interpreted to configure a computer cluster policy. For example, as part of the interpretation phase, configuration module 106 may interpret the user-friendly input entered by the user to configure a computer cluster policy that identifies (1) the application dependencies, (2) one or more platform-agnostic actions to be performed in response to detection of one or more events associated with the application dependencies, and (3) the events that trigger the platform-agnostic actions. In this example, configuration module 106 may configure the computer cluster policy in a manner that enables different types of high-availability software installed in the computer cluster environment to implement the computer cluster policy.

The computer cluster environment may also include an execution phase in which the computer cluster policy is implemented by performing one or more of the platform-agnostic actions in response to detection of one or more of the events associated with the application dependencies. For example, if the computer cluster environment includes different types of high-availability software installed on different computer clusters, each of the different computer clusters may receive a portion of the computer cluster policy that is relevant to that particular computer cluster. In this example, as part of the execution phase, each of the different types of high-availability software may interpret the platform-agnostic actions identified in the relevant portion of the computer cluster policy and identify, based on this interpretation, platform-specific commands capable of performing the platform-agnostic actions upon execution by that particular type of high-availability software. Each of the different types of high-availability software may then be capable of executing one or more of the platform-specific commands in response to detection of one or more of the events associated with the application dependencies.

As explained in greater detail above, by providing a computer cluster policy that identifies platform-agnostic actions to be performed in response to certain events, the various systems and methods described herein may enable the same computer cluster policy to be implemented by different types of high-availability software installed in a computer cluster environment. In addition, by providing a module that configures the computer cluster policy and another module that implements the computer cluster policy, these systems and methods may enable rolling upgrades and/or patches to be individually applied to one module without affecting the other module.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, creating, providing, executing, receiving, implementing, notifying, updating, modifying, distributing, and configuring steps described herein. All or a portion of computing system 410 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, creating, providing, executing, receiving, implementing, notifying, updating, modifying, distributing, and configuring steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for providing computer cluster policies for implementation in computer cluster environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a characteristic or property of a physical device (such as policy-configuration server 206 or one of nodes 202(1)-(N)) by creating a computer cluster policy and/or providing the computer cluster policy for implementation in a computer cluster environment.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing computer cluster policies for implementation in computer cluster environments, at least a portion of the method being performed by a computing device comprising at least one processor, the method comprising:
   identifying a computer cluster environment that comprises:
      a plurality of computer clusters capable of executing a plurality of applications;
      a plurality of different types of high-availability software installed on the plurality of computer clusters within the computer cluster environment;
   creating a computer cluster policy to be implemented by the plurality of computer clusters within the computer cluster environment, the computer cluster policy:
      identifying, within the plurality of applications, at least one dependent application installed on at least one computer cluster within the computer cluster environment, wherein the dependent application is dependent upon at least one other application installed in the computer cluster environment;
      identifying at least one locally triggered platform-agnostic action to be performed on the dependent application installed on the computer cluster in response to detection of a local event associated with a local application installed on the computer cluster;
      identifying at least one remotely triggered platform-agnostic action to be performed on the dependent application installed on the computer cluster in response to detection of a remote event associated with a remote application installed on a remote computer cluster within the computer cluster environment;
   configuring the computer cluster policy in a manner that enables each different type of high-availability software installed in the computer cluster environment to implement the computer cluster policy;
   providing the computer cluster policy to high-availability software installed on the computer cluster to enable the high-availability software to implement the computer cluster policy in the computer cluster by:
      identifying, based on the high-availability software's interpretation of the platform-agnostic action, at least one platform-specific command capable of performing at least one of the locally triggered platform-agnostic action and the remotely triggered platform-agnostic action upon execution of the platform-specific command;
      executing the platform-specific command on the dependent application installed on the computer cluster in response to detection of at least one of the local event associated with the local application installed on the computer cluster and the remote event associated with the remote application installed on the remote computer cluster.

2. The method of claim 1, wherein creating the computer cluster policy to be implemented by the plurality of computer clusters comprises:
   providing a user interface to a user of the computer cluster environment;
   receiving, from the user via the user interface, user input that is used to identify at least one of:
      the dependency between the dependent application and the other application;
      the locally triggered platform-agnostic action to be performed on the dependent application in response to detection of the local event;
      the remotely triggered platform-agnostic action to be performed on the dependent application in response to detection of the remote event;
      the local event;
      the remote event;
   creating the computer cluster policy based at least in part on the user input received from the user via the user interface.

3. The method of claim 1, further comprising:
   receiving a policy upgrade configured to update at least a portion of the computer cluster policy;
   in response to receiving the policy upgrade:
      implementing the policy upgrade by updating the portion of the computer cluster policy;
      notifying the high-availability software of the policy upgrade.

4. The method of claim 3, wherein receiving the policy upgrade configured to update the portion of the computer cluster policy comprises:
   providing a user interface to a user of the computer cluster environment;
   receiving, from the user via the user interface, user input that is used to identify:
      the portion of the computer cluster policy to be updated;
      at least one modification to be incorporated into the portion of the computer cluster policy as part of the policy upgrade.

5. The method of claim 3, wherein implementing the policy upgrade by updating the portion of the computer cluster policy comprises at least one of:
   modifying the computer cluster policy such that the computer cluster policy identifies at least one different dependency associated with the dependent application;
   modifying the computer cluster policy such that the computer cluster policy identifies at least one different platform-agnostic action to be performed on the dependent application;
   modifying the computer cluster policy such that the computer cluster policy identifies at least one different event capable of triggering performance of at least one of the locally triggered platform-agnostic action and the remotely triggered platform-agnostic action on the dependent application.

6. The method of claim 3, wherein notifying the high-availability software of the policy upgrade comprises distributing the updated portion of the computer cluster policy to the high-availability software.

7. The method of claim 1, wherein providing the computer cluster policy to the high-availability software installed in the computer cluster environment comprises:
- receiving a request from the high-availability software to obtain the computer cluster policy;
- in response to receiving the request from the high-availability software, distributing the computer cluster policy to the high-availability software.

8. The method of claim 7, wherein the request to obtain the computer cluster policy was initiated by the high-availability software as part of a boot-up process executed in the computer cluster environment.

9. The method of claim 1, wherein the computer cluster policy comprises, for each computer cluster in the computer cluster environment:
- a local events-actions table that identifies at least one locally triggered platform-agnostic action to be performed by the computer cluster in question in response to detection of a local event associated with a local application capable of being executed by the computer cluster in question;
- a remote events-actions table that identifies at least one remotely triggered platform-agnostic action to be performed by the computer cluster in question in response to detection of a remote event associated with a remote application capable of being executed by a remote computer cluster in the computer cluster environment;
- an application dependencies table that identifies at least one dependency between the local application and the remote application.

10. A system for providing computer cluster policies for implementation in computer cluster environments, the system comprising:
- an identification module programmed to identify a computer cluster environment that comprises:
  - a plurality of computer clusters capable of executing a plurality of applications;
  - a plurality of different types of high-availability software installed on the plurality of computer clusters within the computer cluster environment;
- a configuration module programmed to:
  - create a computer cluster policy to be implemented by the plurality of computer clusters within the computer cluster environment, the computer cluster policy:
    - identifying, within the plurality of applications, at least one dependent application installed on at least one computer cluster within the computer cluster environment, wherein the dependent application is dependent upon at least one other application installed in the computer cluster environment;
    - identifying at least one locally triggered platform-agnostic action to be performed on the dependent application installed on the computer cluster in response to detection of a local event associated with a local application installed on the computer cluster;
    - identifying at least one remotely triggered platform-agnostic action to be performed on the dependent application installed on the computer cluster in response to detection of a remote event associated with a remote application installed on a remote computer cluster within the computer cluster environment;
  - configure the computer cluster policy in a manner that enables each different type of high-availability software installed in the computer cluster environment to implement the computer cluster policy;
- a distribution module programmed to provide the computer cluster policy to high-availability software installed on the computer cluster to enable the high-availability software to implement the computer cluster policy in the computer cluster by:
  - identifying, based on the high-availability software's interpretation of the platform-agnostic action, at least one platform-specific command capable of performing at least one of the locally triggered platform-agnostic action and the remotely triggered platform-agnostic action upon execution of the platform-specific command;
  - executing the platform-specific command on the dependent application installed on the computer cluster in response to detection of at least one of the local event associated with the local application installed on the computer cluster and the remote event associated with the remote application installed on the remote computer cluster;
- at least one processor configured to execute the identification module, the configuration module, and the distribution module.

11. The system of claim 10, wherein the configuration module is further programmed to:
- provide a user interface to a user of the computer cluster environment;
- receive, from the user via the user interface, user input that is used to identify at least one of:
  - the dependency between the dependent application and the other application;
  - the locally triggered platform-agnostic action to be performed on the dependent application in response to detection of the local event;
  - the remotely triggered platform-agnostic action to be performed on the dependent application in response to detection of the remote event;
  - the local event;
  - the remote event;
- create the computer cluster policy based at least in part on the user input received from the user via the user interface.

12. The system of claim 10, wherein the configuration module is further programmed to:
- receive a policy upgrade configured to update at least a portion of the computer cluster policy;
- in response to receiving the policy upgrade:
  - implement the policy upgrade by updating the portion of the computer cluster policy;
  - notify the high-availability software of the policy upgrade.

13. The system of claim 12, wherein the configuration module is further programmed to:
- provide a user interface to a user of the computer cluster environment;
- receive, from the user via the user interface, user input that is used to identify:
  - the portion of the computer cluster policy to be updated;
  - at least one modification to be incorporated into the portion of the computer cluster policy as part of the policy upgrade.

14. The system of claim 10, wherein the configuration module is further programmed to at least one of:
- modify the computer cluster policy such that the computer cluster policy identifies at least one different dependency associated with the dependent application;

modify the computer cluster policy such that the computer cluster policy identifies at least one different platform-agnostic action to be performed on the dependent application;

modify the computer cluster policy such that the computer cluster policy identifies at least one different event capable of triggering performance of at least one of the locally triggered platform-agnostic action and the remotely triggered platform-agnostic action on the dependent application.

15. A non-transitory computer-readable-storage medium comprising one or more computer-executable instructions that, when executed by at least one processor of a computing device, cause the computing device to:

identify a computer cluster environment that comprises:
 a plurality of computer clusters capable of executing a plurality of applications;
 a plurality of different types of high-availability software installed on the plurality of computer clusters within the computer cluster environment;

create a computer cluster policy to be implemented by the plurality of computer clusters within the computer cluster environment, the computer cluster policy:
 identifying, within the plurality of applications, at least one dependent application installed on at least one computer cluster within the computer cluster environment, wherein the dependent application is dependent upon at least one other application installed in the computer cluster environment;
 identifying at least one locally triggered platform-agnostic action to be performed on the dependent application installed on the computer cluster in response to detection of a local event associated with a local application installed on the computer cluster;
 identifying at least one remotely triggered platform-agnostic action to be performed on the dependent application installed on the computer cluster in response to detection of a remote event associated with a remote application installed on a remote computer cluster within the computer cluster environment;

configure the computer cluster policy in a manner that enables each different type of high-availability software installed in the computer cluster environment to implement the computer cluster policy;

provide the computer cluster policy to high-availability software installed on the computer cluster to enable the high-availability software to implement the computer cluster policy in the computer cluster by:
 identifying, based on the high-availability software's interpretation of the platform-agnostic action, at least one platform-specific command capable of performing at least one of the locally triggered platform-agnostic action and the remotely triggered platform-agnostic action upon execution of the platform-specific command;
 executing the platform-specific command on the dependent application installed on the computer cluster in response to detection of at least one of the local event associated with the local application installed on the computer cluster and the remote event associated with the remote application installed on the remote computer cluster.

16. The method of claim 1, further comprising providing the computer cluster policy to a different type of high-availability software installed on the remote computer cluster to enable the different type of high-availability software to implement the computer cluster policy in the remote computer cluster.

17. The method of claim 16, wherein enabling the different type of high-availability software to implement the computer cluster policy in the remote computer cluster comprises enabling the remote computer cluster to:
 identify, based on the different type of high-availability software's interpretation of at least one platform-agnostic action, at least one platform-specific command capable of performing the platform-agnostic action upon execution of the platform-specific command;
 execute the platform-specific command to perform the platform-agnostic action on at least one dependent application installed on the remote computer cluster in response to detection of at least one event associated with at least one additional application installed on at least one additional computer cluster within the computer cluster environment.

18. The method of claim 3, wherein the policy upgrade comprises a rolling upgrade and/or a patch configured to be individually applied to a module that configures the computer cluster policy without affecting the high-availability software's ability to implement the computer cluster policy.

19. The system of claim 12, wherein the policy upgrade comprises a rolling upgrade and/or a patch configured to be individually applied to the configuration module without affecting the high-availability software's ability to implement the computer cluster policy.

* * * * *